(12) United States Patent
Chen

(10) Patent No.: US 11,119,350 B2
(45) Date of Patent: Sep. 14, 2021

(54) DISPLAY PANEL AND DISPLAY APPARATUS

(71) Applicants: HKC Corporation Limited, Shenzhen (CN); Chongqing HKC Optoelectronics Technology Co., Ltd., Chongqing (CN)

(72) Inventor: Yu-Jen Chen, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 174 days.

(21) Appl. No.: 16/325,739

(22) PCT Filed: May 5, 2017

(86) PCT No.: PCT/CN2017/083211
§ 371 (c)(1),
(2) Date: Feb. 15, 2019

(87) PCT Pub. No.: WO2018/120567
PCT Pub. Date: Jul. 5, 2018

(65) Prior Publication Data
US 2019/0204666 A1 Jul. 4, 2019

(30) Foreign Application Priority Data
Dec. 29, 2016 (CN) .......................... 201611248051.1

(51) Int. Cl.
*G02F 1/1335* (2006.01)
*G02F 1/1339* (2006.01)
*G02F 1/1362* (2006.01)

(52) U.S. Cl.
CPC .... *G02F 1/133512* (2013.01); *G02F 1/13394* (2013.01); *G02F 1/133514* (2013.01);
(Continued)

(58) Field of Classification Search
CPC .......... G02F 1/133512; G02F 1/13394; G02F 1/133514; G02F 1/136236; G02F 1/136222; G02F 1/13396
See application file for complete search history.

(56) References Cited

U.S. PATENT DOCUMENTS 6,501,529 B1 * 12/2002 Kurihara ............. G02F 1/13338
345/173
7,518,696 B2 * 4/2009 Jang .................... G02F 1/13394
349/106
(Continued)

FOREIGN PATENT DOCUMENTS

CN 1637528 A 7/2005
CN 101329481 A 12/2008
(Continued)

OTHER PUBLICATIONS

Lina Zou, the International Searching Authority written comments, dated Sep. 2017, CN.
Lina Zou, the International Search Report, dated Sep. 2017, CN.

*Primary Examiner* — Phu Vu

(57) ABSTRACT

The present application discloses a display panel and a display apparatus. The display panel includes: a first substrate; a second substrate; and a plurality of spacers, supporting the first substrate and the second substrate, and disposed between the first substrate and the second substrate, where the spacers are disposed at an interval, and the spacers includes a first spacer and a second spacer, a height gap is formed between the first spacer and the second spacer.

16 Claims, 3 Drawing Sheets

(52) U.S. Cl.
CPC .... *G02F 1/13396* (2021.01); *G02F 1/136222* (2021.01); *G02F 1/136236* (2021.01)

(56) References Cited

U.S. PATENT DOCUMENTS

| | | | | |
|---|---|---|---|---|
| 7,932,986 | B2* | 4/2011 | Lee | G02F 1/13394 349/157 |
| 8,040,484 | B2* | 10/2011 | Kim | G02F 1/13394 349/155 |
| 8,077,286 | B2* | 12/2011 | Takeda | G02F 1/13394 349/156 |
| 8,797,495 | B2* | 8/2014 | Hou | G02F 1/133512 349/155 |
| 8,797,496 | B2* | 8/2014 | Tomioka | G02F 1/1339 349/157 |
| 8,953,136 | B2* | 2/2015 | Yi | G02F 1/133512 349/155 |
| 9,041,895 | B2* | 5/2015 | Shim | G02F 1/133512 349/155 |
| 9,761,632 | B2* | 9/2017 | Li | H01L 27/156 |
| 9,766,514 | B2* | 9/2017 | Choi | G02F 1/136227 |
| 9,989,813 | B2* | 6/2018 | Oh | G02F 1/13394 |
| 10,345,660 | B1* | 7/2019 | Cao | G03F 7/105 |
| 10,747,065 | B2* | 8/2020 | Shan | G02F 1/133514 |
| 2007/0002263 | A1* | 1/2007 | Kim | G02F 1/13394 349/156 |
| 2007/0069204 | A1* | 3/2007 | Jang | G02F 1/13394 257/40 |
| 2007/0121054 | A1* | 5/2007 | Jang | G02F 1/1341 349/187 |
| 2009/0115947 | A1* | 5/2009 | Huang | G02F 1/13394 349/106 |
| 2009/0231522 | A1* | 9/2009 | Kim | G02F 1/13394 349/106 |
| 2009/0279013 | A1* | 11/2009 | Kang | G02F 1/13338 349/48 |
| 2009/0323007 | A1* | 12/2009 | Shim | G02F 1/13394 349/155 |
| 2010/0110022 | A1* | 5/2010 | Chen | G06F 3/0412 345/173 |
| 2011/0187631 | A1* | 8/2011 | Lee | G09G 3/36 345/87 |
| 2012/0081641 | A1* | 4/2012 | Noh | G02F 1/13394 349/106 |
| 2013/0050619 | A1* | 2/2013 | Kim | G02F 1/13394 349/106 |
| 2016/0005790 | A1* | 1/2016 | Li | H01L 27/322 257/89 |
| 2017/0090233 | A1* | 3/2017 | Xu | G02F 1/133514 |
| 2017/0147110 | A1* | 5/2017 | Xu | G02F 1/136286 |
| 2017/0192280 | A1* | 7/2017 | Kwak | G02F 1/136286 |
| 2018/0120629 | A1* | 5/2018 | Zhao | G02F 1/1337 |
| 2018/0335665 | A1* | 11/2018 | Deng | G02F 1/13394 |
| 2019/0129211 | A1* | 5/2019 | Kim | G02F 1/13394 |
| 2019/0179183 | A1* | 6/2019 | Chen | G02F 1/13394 |
| 2019/0219858 | A1* | 7/2019 | Ye | G02F 1/13439 |

FOREIGN PATENT DOCUMENTS

| | | |
|---|---|---|
| CN | 101452158 A | 6/2009 |
| CN | 103149741 A | 6/2013 |
| JP | 2002341354 A | 11/2002 |
| JP | 2005326887 A | 11/2005 |

\* cited by examiner

DISPLAY PANEL AND DISPLAY APPARATUS

TECHNICAL FIELD

The present application relates to the technical field of displays, and more particularly to a display panel and a display apparatus.

BACKGROUND

Liquid crystal display apparatuses (LCD apparatuses) have numerous advantages, such as a thin body, power saving, no radiation, etc., and are widely used. Most liquid crystal display apparatuses in the current market are backlight liquid crystal display apparatuses, each including a liquid crystal panel and a Backlight assembly. Working principle of the liquid crystal panel is that liquid crystals are put in two parallel glass substrates, and a driving voltage is applied to the two glass substrates to control rotation direction of the liquid crystals, to refract light rays of the Backlight assembly to generate a picture.

Thin film transistor-liquid crystal display apparatuses (TFT-LCD apparatuses) currently maintain a leading status in the display field because of low power consumption, excellent picture quality, high production yield, and other properties. Similarly, the TFT-LCD apparatus includes a liquid crystal panel and a Backlight assembly. The liquid crystal panel includes a color filter substrate (CF substrate), a thin film transistor substrate (TFT substrate) and a mask, and transparent electrodes on relative inner sides of the above substrates. A layer of liquid crystals (LC) is positioned between two substrates.

R/G/B color photoresistor and spacer (PS) of existing upper-panel color filter are manufactured on one side of an array substrate. The spacer (PS) are not easy to form a height gap causing Mura to easily form during pressing. Therefore, cell forming quality is influenced and various traces are formed due to no uniform brightness of the display apparatus.

SUMMARY

The objective of the present application is to provide a display panel, to enhance case forming quality.

In addition, the present application further provides a display apparatus including the above display panel.

The purpose of the present application is realized by the following technical solution. A display panel, including: a first substrate; a second substrate; and a plurality of spacers, supporting the first substrate and the second substrate, and disposed between the first substrate and the second substrate, Where the spacers are disposed at an interval, and the spacers includes a first spacer and a second spacer, a height gap is formed between the first spacer and the second spacer.

The first spacer and the second spacer are disposed adjacent to each other. The height gap is formed between the two adjacent spacer, so that uniform arrangement of the height gap is thoroughly used to increase a liquid crystal margin, effectively avoid forming Mura and ensure the quality of the display panel.

The display panel further includes a black matrix, the black matrix is disposed between the first substrate and the spacers, the black matrix creates height differences at locations corresponding to the first spacer and the second spacer, and correspondingly, the height gap is formed between the first spacer and the second spacer. Multiple heights of the black matrix (BM) are formed on the black matrix (BM), to allow the corresponding spacer (PS) to form a height gap, thereby avoiding influencing cell forming quality due to Mura formed during pressing.

The first substrate further includes a first glass substrate, the first glass substrate is provided with an inward-facing protrusion at a location corresponding to the first spacer or the second spacer, the protrusion creates height differences at the locations corresponding to the first spacer and the second spacer, and correspondingly, the height gap is formed between the first spacer and the second spacer. The structures of the protrusions on the first glass substrate are used, and the protrusions are arranged simply, to allow the corresponding spacer (PS) to form a height gap, thereby avoiding influencing cell forming quality due to Mura formed during pressing.

The second substrate further includes a second glass substrate and a color photoresist layer, the color photoresist layer is disposed between the second glass substrate and the spacers, the color photoresist layer creates height differences at locations corresponding to the first spacer and the second spacer, and correspondingly, the height gap is formed between the first spacer and the second spacer. Heights of the color filter are varied. The spacer (PS) are manufactured on the color filter. After the spacer (PS) are formed, the height gap is formed by using the topographic advantage, thereby avoiding influencing cell forming quality due to Mura formed during pressing.

The second substrate further includes a second glass substrate and a color photoresist layer, the color photoresist layer is disposed between the second glass substrate and the spacers, heights of the color photoresist layers at locations corresponding to the spacers are equal, a conductive layer is disposed between the first spacer and a corresponding color photoresist layer, and a conductive layer and a protection layer are disposed between the second spacer and a corresponding color photoresist layer. The protective layers under the spacer (PS) have different heights. The protective layer under the corresponding spacer (PS) is directly dug out, which is simple in steps. The spacer (PS) are manufactured on the protective layers. After the spacer (PS) are formed, the height gap is formed by using the topographic advantage, thereby avoiding influencing cell forming quality due to Mura formed during pressing.

The second substrate includes thin film transistors, and the first spacer and the second spacer are respectively disposed above the two adjacent thin film transistors. Relative positions between the thin film transistors and the spacer are defined.—

A height difference is formed between a contact surface between the first spacer and the first substrate and a contact surface between the second spacer and the first substrate, and a height difference between a contact surface between the first spacer and the second substrate and a contact surface between the second spacer and the second substrate, and correspondingly, the height gap is formed between the two spacers.—The height gap is formed in both of two substrate directions, and the height gap can be increased for the convenience of successfully making the entire display panel, thereby avoiding influencing a display of the display panel due to a limited height gap value.

A height difference is formed between the first spacer and the second spacer through use of the half tone mask. Where a height difference is formed between the black matrix corresponding to the first spacer and the black matrix corresponding to the second spacer through use of the half tone mask. A height difference is formed between an inner side surface of the color photoresist layer corresponding to the first spacer and an inner side surface of the color photoresist layer corresponding to the second spacer through use of the half tone mask. By using the half tone mask, two exposure processes are combined into one working procedure, thereby saving one exposure process, shortening a production cycle, increasing production efficiency, reducing production costs and enhancing market competitiveness.

According to another aspect of the present application, the present application further discloses a display apparatus including a Backlight assembly and the above display panel.

A height gap is formed between the two spacer, to avoid influencing cell forming quality due to Mura formed during pressing, thereby enhancing display, realizing better display of the panel, enabling better viewing experiences for users, simultaneously saving costs and enhancing product competitiveness.

BRIEF DESCRIPTION OF DRAWINGS

The drawings included are used for providing further understanding of embodiments of the present application, constitute part of the description, are used for illustrating implementation manners of the present application, and interpreting principles of the present application together with text description. Apparently, the drawings in the following description are merely some embodiments of the present application, and for those of ordinary skill in the art, other drawings can also be obtained according to the drawings without contributing creative labor. In the drawings.

DETAILED DESCRIPTION

Figure 1:
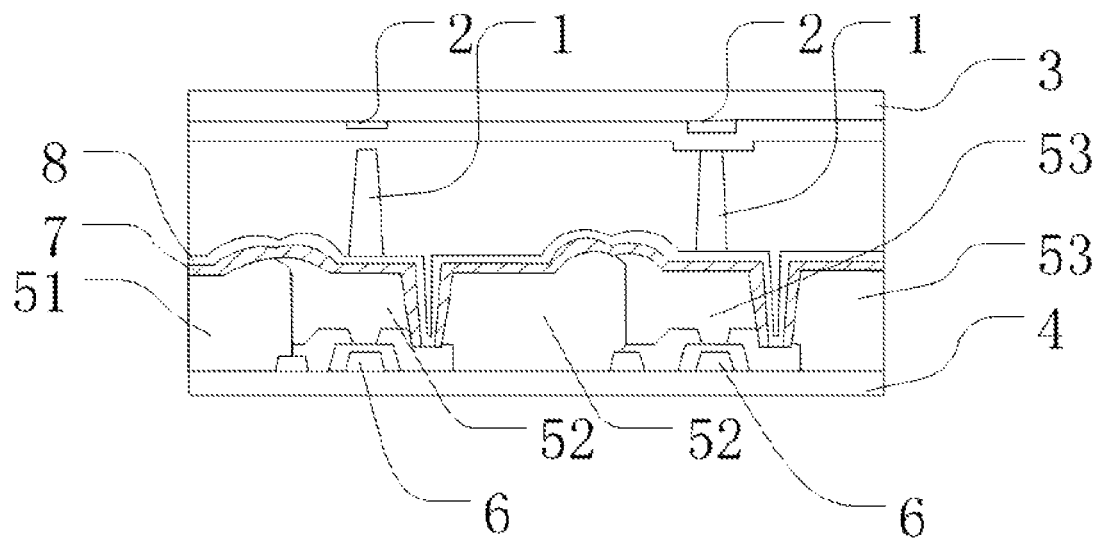
FIG. 1 is a structural schematic diagram of a display panel of an embodiment of the present application.

Specific structure and function details disclosed herein are only representative and are used for the purpose of describing exemplary embodiments of the present application. However, the present application may be specifically achieved in many alternative forms and shall not be interpreted to be only limited to the embodiments described herein.

It should be understood in the description of the present application that terms such as "central", "horizontal", "upper", "lower", "left", "right", "vertical", "horizontal", "top", "bottom", "inner", "outer", etc. indicate direction or position relationships shown based on the drawings, and are only intended to facilitate the description of the present application and the simplification of the description rather than to indicate or imply that the indicated apparatus or element must have a specific direction or constructed and operated in a specific direction, and therefore, shall not be understood as a limitation to the present application. In addition, the terms such as "first" and "second" are only used for the purpose of description, rather than being understood to indicate or imply relative importance or hint the number of indicated technical features. Thus, the feature limited by "first" and "second" can explicitly or impliedly include one or more features. In the description of the present application, the meaning of "a plurality of" is two or more unless otherwise specified. In addition, the term "include" and any variant are intended to cover non-exclusive inclusion.

It should be noted in the description of the present application that, unless otherwise specifically regulated and defined, terms such as "installation", "bonded" and "bonding" shall be understood in broad sense, and for example, may refer to fixed bonding or detachable bonding or integral bonding, may refer to mechanical bonding or electrical bonding, and may refer to direct bonding or indirect bonding through an intermediate medium or inner communication of two elements. For those of ordinary skill in the art, the meanings of the above terms in the present application may be understood according to specific conditions.

The terms used herein are intended to merely describe specific embodiments, not to limit the exemplary embodiments. Unless otherwise noted clearly in the context, singular forms "one" and "single" used herein are also intended to include plurals. It should also be understood that the terms "include" and/or "include" used herein specify the existence of stated features, integers, steps, operation, units and/or assemblies, not excluding the existence or addition of one or more other features, integers, steps, operation, units, assemblies and/or combinations of these.

The present application will be further described in detail below in combination with the drawings and embodiments.

The structural schematic diagram of the display panel of the embodiment of the present application is described below with reference to FIG. 1 to FIG. 4.

The purpose of the present application is realized by the following technical solution. The display panel includes a first substrate and a second substrate. a plurality of spacers, supporting the first substrate and the second substrate, and disposed between the first substrate and the second substrate, where the spacers are disposed at an interval, and the spacers includes a first spacer and a second spacer, a height gap is formed between the first spacer and the second spacer. A height gap may be formed between the two spacer 1, to avoid influencing cell forming quality due to Mura formed during pressing, thereby enhancing display, realizing better display of the panel, enabling better viewing experiences for users, simultaneously saving costs and enhancing product competitiveness.

As another embodiment of the present application, the display panel further includes a black matrix, the black matrix is disposed between the first substrate and the spacers, the black matrix creates height differences at locations corresponding to the first spacer and the second spacer, and correspondingly, the height gap is formed between the first spacer and the second spacer. Heights of the black matrix 2 are varied, to allow height between the black matrix and the corresponding spacer to be formed a height gap thereby avoiding influencing cell forming quality due to Mura formed during pressing.

Specifically, FIG. 1 shows a structural schematic diagram of the display panel of an embodiment of the present application. Through use of a half tone mask, a height difference is formed between the black matrix 2 and two adjacent spacer 1 corresponding to the black matrix 2. Accordingly, a height gap is formed between the two adjacent spacer 1. The height gap is formed between the two adjacent spacer 1, so that uniform arrangement of the height gap is thoroughly used to increase a liquid crystal margin, effectively avoid formation of Mura and ensure the display panel quality. Of course, in addition to the height gap is formed between the two adjacent spacer 1, the first spacer and the second spacer are disposed at an interval, and spaced distances between adjacent first spacers are uniform, or spaced distances between adjacent second spacers are uniform, or may be in other specific sequences, where a difference value of the height gap may be constant or variable.

Where the height difference is formed between the black matrix 2 and the two adjacent spacer 1 in corresponding to the black matrix 2 through use of the half tone mask. By using the half tone mask, two exposure processes are combined into one working procedure, thereby saving one exposure process, shortening a production cycle, increasing production efficiency, reducing production costs and enhancing market competitiveness. A portion of light transmission of a grating is used in the half tone mask, so that a photo resist is exposed not completely. How many light rays of the light transmission is determined by a semi-permeable membrane portion according to the height difference of required passivation layers, and generally, the transmittance is about 35% of that of a normal portion.

In one or more embodiments of the present application, the first substrate further includes a first glass substrate, the first glass substrate is provided with an inward-facing protrusion at a location corresponding to the first spacer or the second spacer, the protrusion creates height differences at the locations corresponding to the first spacer and the second spacer, and correspondingly, the height gap is formed between the first spacer and the second spacer. Structures of the protrusions 31 on the first glass substrate 3 are used, and the protrusions 31 are arranged simply, to allow distance between the first glass substrate and each of the corresponding spacer (PS) 1 to be formed a height gap, thereby avoiding influencing cell forming quality due to Mura formed during pressing. Of course, the first glass substrate 3 can be provided with protrusions 31 to protrude inwards on the first spacer and the second spacer corresponding to the protrusions 31 of the first glass substrate, but heights of the protrusions of the first glass substrate corresponding to the spacers are different.

Specifically, the protrusion forms a height difference at the corresponding positions of the adjacent first spacers or the adjacent second spacers, and correspondingly, the height gap is formed between the first spacer and the second spacer. The height gap is formed between the two adjacent spacer 1, so that uniform arrangement of the height gap is thoroughly used to increase a liquid crystal margin, effectively avoid formation of Mura and ensure the display panel quality. Of course, in addition to the height gap is formed between the two adjacent spacer 1 and the height gap is formed between the two interval spacer 1, and spaced distances may be uniform or may be in other specific sequences, where a difference value of the height gap may be constant or variable.

Figure 2:
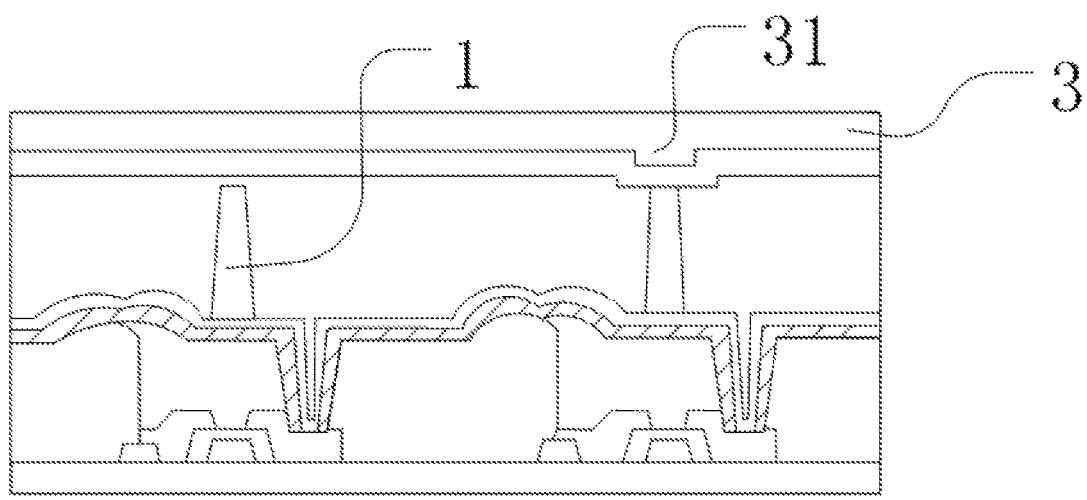
FIG. 2 is a structural schematic diagram of a display panel of an embodiment of the present application.

Specifically, FIG. 2 shows a structural schematic diagram of the display panel of an embodiment of the present application. Height of one protrusion 31 in the two adjacent protrusions 31 is 0. The two adjacent spacer 1 correspondingly disposed on the first glass substrate 3, and the inner side of first glass substrate 3 is provided with a protrusion 31 corresponding to the first spacer, and the inner side of first glass substrate is not provided with a protrusion 31 corresponding to the second spacer, to allow height between the first glass substrate and the corresponding spacer to be formed a height gap.

In one or more embodiments of the present application, the second substrate further includes a second glass substrate and a color photoresist layer, the color photoresist layer is disposed between the second glass substrate and the spacers, the color photoresist layer creates height differences at locations corresponding to the first spacer and the second spacer, and correspondingly, the height gap is formed between the first spacer and the second spacer. Heights of the color photoresist are varied. The spacer (PS) 1 are manufactured on the color photoresist. After the spacer (PS) 1 are formed, the height gap is formed by using the topographic advantage, thereby avoiding influencing cell forming quality due to Mura formed during pressing.

Specifically, a height difference is formed between the color photoresist layer and two adjacent spacers 1 corresponding to the color photoresist layer. Accordingly, a height gap is formed between the two adjacent spacer 1. The height gap is formed between the two adjacent spacer 1, so that uniform arrangement of the height gap is thoroughly used to increase a liquid crystal margin, effectively avoid formation of Mura and ensure the quality of the display panel. Of course, in addition to the height gap is formed between the two adjacent spacer 1, the height gap can also exist between the spacer 1, and spaced distances may be uniform or may be in other specific sequences, where a difference value of the height gap may be constant or variable.

Figure 3:
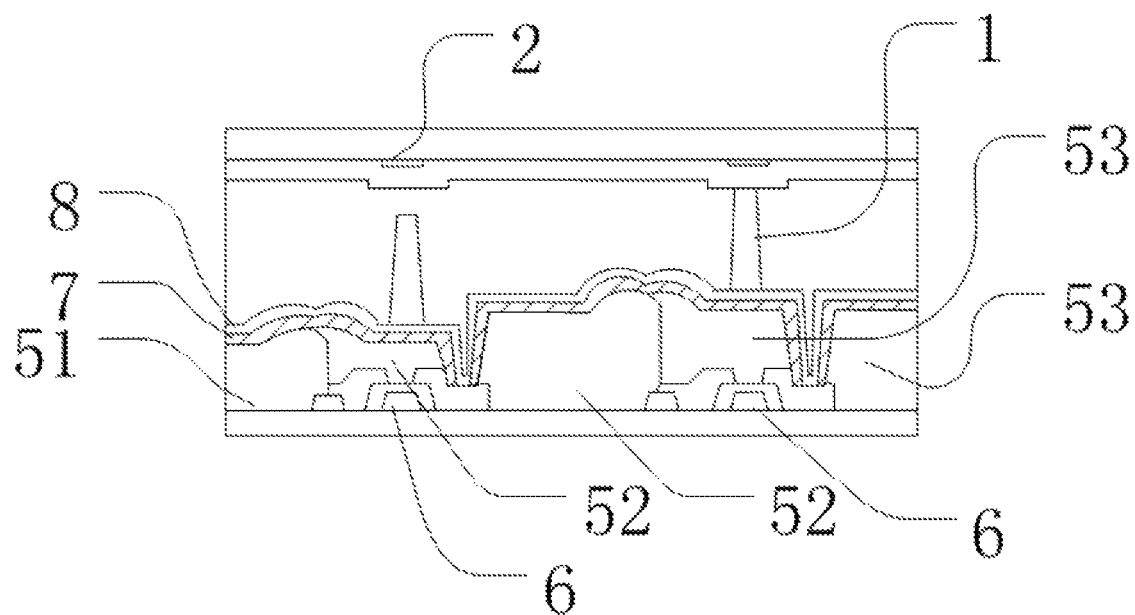
FIG. 3 is a structural schematic diagram of a display panel of an embodiment of the present application.

Specifically, FIG. 3 shows a structural schematic diagram of the display panel of an embodiment of the present application. The color photoresist layer includes an R color photoresistor 51, G color photoresistor 52 and a B color photoresistor.

Two adjacent G color photoresistor 52 form a height difference through use of the half tone mask. Accordingly, the height gap is formed between the spacer 1 disposed on the G color photoresistor 52 and the spacer 1 disposed on the B color photoresistor 53, to effectively solve of the Mura.

Specifically, the height difference is formed between the color photoresist layer and two adjacent spacers 1 corresponding to the color photoresist layer through use of the half tone mask. By using the half tone mask, two exposure processes are combined into one working procedure, thereby saving one exposure process, shortening a production cycle, increasing production efficiency, reducing production costs and enhancing market competitiveness. A portion of light transmission of a grating is used in the half tone mask, so that a photo resist is exposed not completely.

How many light rays of the light transmission is determined by a semi-permeable membrane portion according to the height difference of required passivation layers, and generally, the transmittance is about 35% of that of a normal portion.

In one or more embodiments of the present application, the second substrate further includes a second glass substrate and a color photoresist layer, the color photoresist layer is disposed between the second glass substrate and the spacers. The height difference is formed between protective layer 7 corresponding to the first spacer 1 and protective layer 7 corresponding to the second spacer 1. Accordingly, a height gap is formed between the two spacer 1. The protective layers 7 under the spacer (PS) 1 have different heights. The spacer (PS) 1 are manufactured on the protective layer 7. After the spacer (PS) 1 are formed, the height gap is formed by using the topographic advantage, thereby avoiding influencing cell forming quality due to Mura formed during pressing.

Specifically, the height difference is formed between the protective layer 7 and the two adjacent spacer 1 corresponding to the protective layer 7. Accordingly, a height gap is formed between the two adjacent spacer 1. The height gap is formed between the two adjacent spacer 1, so that uniform arrangement of the height gap is thoroughly used to increase a liquid crystal margin, effectively avoid formation of Mura and ensure the display panel quality. Of course, in addition to the height gap is formed between the two adjacent spacer 1, the height gap can also exist between the spacer 1, and spaced distances may be uniform or may be in other specific sequences, where a difference value of the height gap may be constant or variable.

Specifically, heights of the color photoresist layers at locations corresponding to the spacers are equal, a conductive layer is disposed between the first spacer and a corresponding color photoresist layer, and a conductive layer and a protection layer are disposed between the second spacer and a corresponding color photoresist layer. The protective layer 7 under the corresponding spacer (PS) 1 is directly dug out to form the height gap, which is simple in steps. where the second substrate includes thin film transistors, and the first spacer and the second spacer are respectively disposed above the two adjacent thin film transistors 6. The thin film transistors 6 are compositions formed by stacking a plurality of polygons as shown in the figure, and the conducting layer 8 is connected to drains of the thin film transistors 6, where the color photoresist layer corresponding to the two spacer 1 have different colors.

Figure 4:
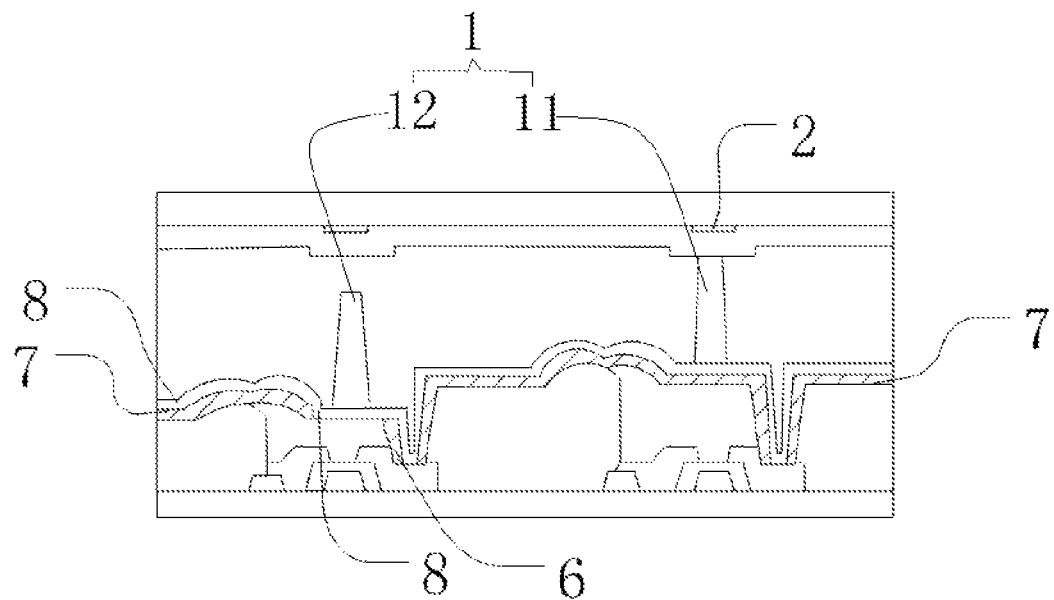
FIG. 4 is a structural schematic diagram of a display panel of an embodiment of the present application.

Specifically, besides the protective layer 7 corresponding to the spacer can only be dug out, to form a height gap between the spacer 1, the height gap can also be formed more adequately in such a manner that the color photoresist is processed through use of the half tone mask to form the height difference. FIG. 4 shows a structural schematic diagram of the display panel of an embodiment of the present application. The color photoresist layer includes an R color photoresistor, a G color photoresistor, and a B color photoresistor. A height difference is created between two adjacent G color photoresistor and the B color photoresistor, where the G color photoresistor is formed using a half-tone mask, and a protective layer under the G color photoresistor is dug out, and correspondingly, a height gap is formed between a spacer on the G color photoresistor and a spacer on the B color photoresistor, to effectively solve of Mura.

In one or more embodiments of the present application, a height difference is formed between a contact surface between the first spacer and the first substrate and a contact surface between the second spacer and the first substrate, and a height difference between a contact surface between the first spacer and the second substrate and a contact surface between the second spacer and the second substrate, and correspondingly, the height gap is formed between the two spacers. The height gap is formed in both of two substrate directions, and the height gap can be increased for the convenience of successfully making the entire display panel, thereby avoiding influencing a display of the display panel due to a limited height gap value.

Figure 5:
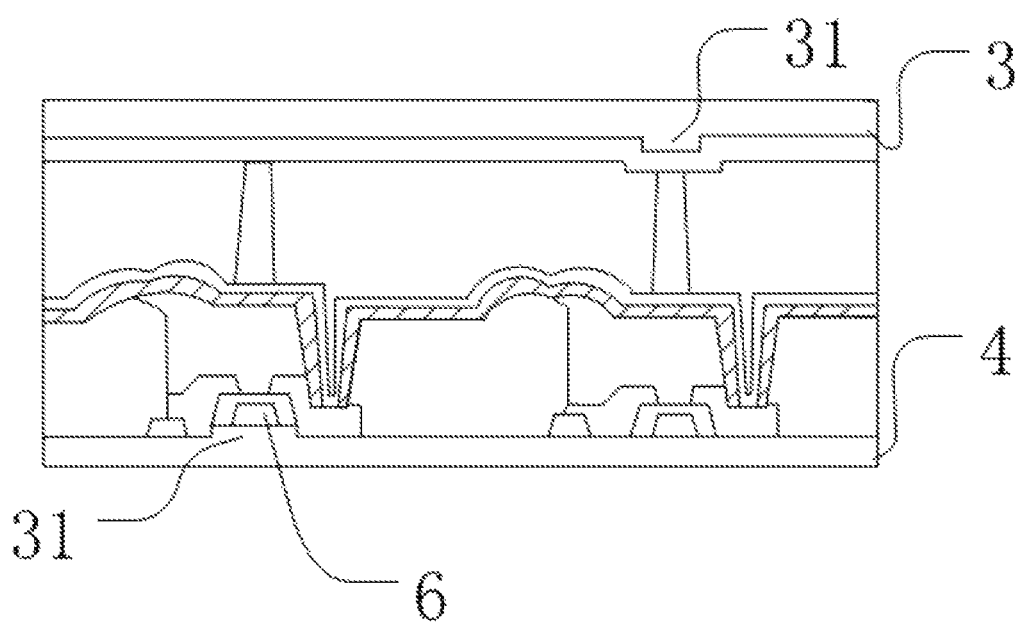
FIG. 5 is a structural schematic diagram of a display panel of an embodiment of the present application.

Specifically, FIG. 5 shows a structural schematic diagram of the display panel of an embodiment of the present application. The first glass substrate 3 forms the protrusion 31 corresponding to the spacer 1, and the second glass substrate 4 forms the protrusion 31 corresponding to the spacer 1, so that the two spacer 1 form a height gap with a greater difference value. Of course, in addition to the manner that the glass substrate is inwards provided with the protrusions 31, other manners can also be adopted; and the manners adopted on one side of the first substrate and on one side of the second substrate may be also different.

A photo-initiator in each of spacer 1 is identical. The same photo-initiator is arranged in different spacer 1. Irradiated by light rays of different wavelengths, the different spacer 1 produce different degrees of cross-linking reactions, thereby the height gap different spacer 1. The light rays of different wavelengths are adopted for irradiating the same photo-initiator and the spacer 1. The different spacer 1 are controlled to produce the cross-linking reactions of different degrees under the effect of the light rays of different wavelengths, to further control the shrinkage of the different spacer 1. Control effect is good, so that the height gap between the different spacer 1 achieves a preset need. In addition, for such configuration on a production technology, the different spacer 1 are not required to be configured differently, and configuration is simple.

Specifically, the black matrix and the second spacer are disposed as a same height, a height of the first spacer is higher than a height of the second spacer, and the second spacer is located between the first spacer and the black matrix. It is better that the first spacer is configured to be higher than the second spacer and the black matrix 2, the second spacer is configured to have an equal height to the black matrix 2, and the heights of the first spacer, the second spacer and the black matrix 2 are controlled, i.e., the control effect for the height gap is better, so that the display of the display panel is better.

A value of the step between the first spacer and the second spacer is greater than or equal to 0.5 μm. Specifically, the height difference between the height H1 of the first spacer and the height H2 of the second spacer is greater than or equal to 0.5 um. When the height gap value between the first spacer and the second spacer is less than 0.5 um, there is a large display influence on the display panel, and other manufacturing processes are influenced, such that the difficulty of the entire display panel is increased. The shrinkage among the different spacer is controlled under coordination of the light rays of different wavelengths and the photo-initiator, to control the height gap between the first spacer and the second spacer to be greater than or equal to 0.5 um, thereby facilitating the successful manufacturing of the entire display panel and avoiding influencing the display of the display panel due to a limited height gap value.

In still another embodiment of the present application, the present embodiment discloses a Backlight assembly and a display panel of the display apparatus. See FIG. 1 to FIG. 5 for specific structures and bonding relationships of the display panel, which will not be described in detail herein.

The above contents are further detailed descriptions of the present application in combination with embodiments. However, the specific implementation of the present application shall not be considered to be only limited to these descriptions. For those of ordinary skill in the art to which the present application belongs, several simple deductions or replacements may be made without departing from the conception of the present application, all of which shall be considered to belong to the protection scope of the present application.

What is claimed is:
1. A display panel, comprising:
a first substrate;
a second substrate comprising a plurality of thin film transistors; and
a plurality of spacers, supporting the first substrate and the second substrate, and disposed between the first substrate and the second substrate, and wherein the spacers protrude from the thin film transistors of the second substrate to the first substrate and a width of each of the spacers gradually narrows from the thin film transistors of the second substrate to the first substrate;

wherein the spacers are disposed at an interval, and the spacers comprises a first spacer and a second spacer, a height gap is formed between the first spacer and the second spacer;

wherein the second substrate further comprises a second glass substrate and a color photoresist layer, the color photoresist layer is disposed between the second glass substrate and the spacers, the color photoresist layer creates a height difference at locations corresponding to the first spacer and the second spacer, and correspondingly, the height gap is formed between the first spacer and the second spacer;

wherein a height difference is formed between an inner side surface of the color photoresist layer corresponding to the first spacer and an inner side surface of the color photoresist layer corresponding to the second spacer through use of a half tone mask.

2. The display panel according to claim 1, wherein the first spacer and the second spacer are disposed adjacent to each other.

3. The display panel according to claim 1, wherein the display panel farther comprises a black matrix, the black matrix is disposed between the first substrate and the spacers, the black matrix creates height differences at locations corresponding to the first spacer and the second spacer, and correspondingly, the height gap is formed between the first spacer and the second spacer.

4. The display panel according to claim 1, Wherein the first substrate farther comprises a first glass substrate, the first glass substrate is provided with an inward-facing protrusion at a location corresponding to the first spacer or the second spacer, the protrusion creates height differences at the locations corresponding to the first spacer and the second spacer, and correspondingly, the height gap is formed between the first spacer and the second spacer.

5. The display panel according to claim 1, wherein the first spacer and the second spacer are respectively disposed above the two adjacent thin film transistors.

6. The display panel according to claim 1, wherein a height difference is formed between a contact surface between the first spacer and the first substrate and a contact surface between the second spacer and the first substrate, and a height difference between a contact surface between the first spacer and the second substrate and a contact surface between the second spacer and the second substrate, and correspondingly, the height gap is formed between the two spacers.

7. A display apparatus, comprising a backlight assembly and a display panel, wherein the display panel comprises:
a first substrate,
a second substrate comprising a plurality of thin film transistors, and
a plurality of spacers, supporting the first substrate and the second substrate, and disposed between the first substrate and the second substrate, and
wherein the spacers protrude from the thin film transistors of the second substrate to the first substrate and a width of each of the spacers gradually narrows from the thin film transistors of the second substrate to the first substrate;

wherein the second substrate fluffier comprises a second glass substrate and a color photoresist layer, the color photoresist layer is disposed between the second glass substrate and the spacers, the color photoresist layer creates a height difference at locations corresponding to the first spacer and the second spacer, and correspondingly, the height gap is formed between the first spacer and the second spacer;

wherein a height difference is formed between an inner side surface of the color photoresist layer corresponding to the first spacer and an inner side surface of the color photoresist layer corresponding to the second spacer through use of a half tone mask.

8. The display panel according to claim 1, wherein a value of the step between the first spacer and the second spacer is greater than or equal to 0.5 μm.

9. The display panel according to claim 4, wherein heights of the protrusions of the first glass substrate corresponding to the spacers are different.

10. The display panel according to claim 9, wherein the protrusion forms a height difference at the corresponding positions of the adjacent first spacers or the adjacent second spacers, and correspondingly, the height gap is formed between the first spacer and the second spacer.

11. The display panel according to claim 1, wherein the color photoresist layer comprises an R color photoresistor, a GG color photoresistor, and a B color photoresistor.

12. The display panel according to claim 11, wherein a height difference is created between two adjacent G color photoresistor and B color photoresistor, wherein the G color photoresistor is formed using a half-tone mask, and a protective layer under the G color photoresistor is dug out, and correspondingly, a height gap is formed between a spacer on the G color photoresistor and a spacer on the B color photoresistor.

13. The display panel according to claim 3, wherein a height difference is formed between the black matrix corresponding to the first spacer and the black matrix corresponding to the second spacer through use of the half tone mask.

14. The display panel according to claim 11, wherein the first spacer corresponding to the G color photoresistor does not contact the first substrate.

15. The display panel according to claim 11, wherein the G color photoresistor comprises a higher portion and a lower portion formed by half tone mask, the first spacer is disposed on the lower portion.

16. The display panel according to claim 15, wherein the protection layer is disposed on the G color filter and B color filter, the conductive layer is disposed on the protection layer; the protection layer on the lower portion is removed, so that the conductive layer directly contacts the lower portion.

* * * * *